US011398164B2

(12) United States Patent
Moon et al.

(10) Patent No.: US 11,398,164 B2
(45) Date of Patent: Jul. 26, 2022

(54) PROVIDING CONTEXTUALLY RELEVANT INFORMATION FOR AMBIGUOUS LINK(S)

(71) Applicant: Microsoft Technology Licensing, LLC, Redmond, WA (US)

(72) Inventors: Mariah Sigourney Moon, Seattle, WA (US); Carolina Hernandez, Seattle, WA (US); Sichen Lu, Bellevue, WA (US); Lukasz Zygmunt Makar, Bellevue, WA (US); Ravi Gupta, Seattle, WA (US); Jason Anthony Grieves, Bellevue, WA (US); Elbio Renato Torres Abib, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/545,290

(22) Filed: Aug. 20, 2019

(65) Prior Publication Data
US 2020/0372830 A1 Nov. 26, 2020

Related U.S. Application Data

(60) Provisional application No. 62/852,190, filed on May 23, 2019.

(51) Int. Cl.
*G06F 3/0482* (2013.01)
*G09B 21/00* (2006.01)
(Continued)

(52) U.S. Cl.
CPC ......... *G09B 21/006* (2013.01); *G06F 3/0482* (2013.01); *G06F 16/957* (2019.01); *G06F 16/9558* (2019.01)

(58) Field of Classification Search
CPC . G09B 21/006; G06F 16/9558; G06F 16/957; G06F 3/0482
See application file for complete search history.

(56) References Cited

U.S. PATENT DOCUMENTS 9,519,689 B2 * 12/2016 Redfern ............ G06F 16/24578
10,276,065 B2 * 4/2019 Carro ................... G09B 21/001
(Continued)

OTHER PUBLICATIONS

Christoph Kofler et al., User Intent in Multimedia Search: A Survey of the State of the Art and Future Challenges, Aug. 2016, ACM, pp. 1-37 (Year: 2016).*

(Continued)

*Primary Examiner* — Phenuel S Salomon
(74) *Attorney, Agent, or Firm* — Rainier Patents, P.S.

(57) ABSTRACT

Described herein is a screen reader system for providing contextually relevant information for ambiguous link(s). Input is received from a user requesting information about a particular link of a web page. In response to the received user input, a request for contextually relevant information regarding the particular link (e.g., page identifier) is provided to a search engine. The request can include a uniform resource locator (URL) associated with the particular link. Contextually relevant information regarding the particular link is received from the search engine. The received contextually relevant information is provided (e.g., displayed and/or read) to the user in response to the received request for information.

21 Claims, 10 Drawing Sheets

(51) Int. Cl.
   *G06F 16/955*   (2019.01)
   *G06F 16/957*   (2019.01)

(56) References Cited

U.S. PATENT DOCUMENTS

| | | | |
|---|---|---|---|
| 2005/0183109 A1* | 8/2005 | Basson | H04N 7/17336 725/4 |
| 2007/0074123 A1* | 3/2007 | Omura | G06F 16/4393 715/753 |
| 2011/0161341 A1* | 6/2011 | Johnston | G06F 16/90332 707/766 |
| 2013/0047100 A1* | 2/2013 | Kroeger | G06F 3/0488 715/760 |
| 2013/0063494 A1 | 3/2013 | Kirschner et al. | |
| 2013/0163765 A1* | 6/2013 | De Jong | H04S 7/304 381/17 |
| 2013/0173599 A1* | 7/2013 | Chowdhury | G06F 16/345 707/722 |
| 2014/0075085 A1* | 3/2014 | Schroder | G06F 13/4022 710/317 |
| 2014/0089772 A1* | 3/2014 | Shetty | G06F 16/958 715/206 |
| 2014/0380149 A1* | 12/2014 | Gallo | G06F 40/143 715/234 |
| 2015/0113410 A1* | 4/2015 | Bradley | G06F 3/167 715/728 |
| 2015/0319503 A1* | 11/2015 | Mishra | H04N 21/47202 725/53 |
| 2016/0019306 A1* | 1/2016 | Jung | G06F 16/9558 715/205 |
| 2016/0224621 A1* | 8/2016 | Bousquet | G06F 16/9535 |
| 2017/0371877 A1* | 12/2017 | Badr | G06F 16/24575 |
| 2020/0371754 A1* | 11/2020 | P K | G06F 40/20 |

OTHER PUBLICATIONS

Mahmud et al., CSurf: A Context-Driven Non-Visual Web-Browser, May 8-12, 2007; World Wide Web Conference; pp. 31-40 (Year: 2007).*

Microsoft Corporation, "UI Automation Specification", May 30, 2018, retrieved from https://docs.microsoft.com/en-us/windows/win32/winauto/ui-automation-specification on Aug. 17, 2019, 5 pages.

Microsoft Corporation, "Microsoft Active Accessibility and UI Automation Compared", May 30, 2018, retrieved from https://docs.microsoft.com/en-us/windows/win32/winauto/microsoft-active-accessibility-and-ui-automation-compared on Aug. 17, 2019, 5 pages.

"Screen Reader User Survey #7 Results", Retrieved from: https://web.archive.org/web/20171221223705/https://webaim.org/projects/screenreadersurvey7/, Dec. 21, 2017, 22 Pages.

"Web Search API—v7", Retrieved from: https://dev.cognitive.microsoft.com/docs/services/f40197291cd14401b93a478716e818bf/operations/56b4447dcf5ff8098cef380d, Retrieved Date: Sep. 6, 2019, 07 Pages.

Harper, et al., "Middleware to Expand Context and Preview in Hypertex", In Proceedings of the 6th International ACM SIGACCESS Conference on Computers and Accessibility, Oct. 18, 2004, pp. 63-70.

Mahmud, et al., "Csurf", In Proceedings of 16th International World Wide Web Conference, May 8, 2007, pp. 31-40.

"International Search Report and Written Opinion Issued in PCT Application No. PCT/US2020/028179", dated Jun. 30, 2020, 12 Pages.

Yang, et al., "Design of a Clothing Shopping Guide Website for Visually Impaired People", In Proceedings of International Conference on Cross-Cultural Design, Jul. 19, 2015, pp. 253-261.

* cited by examiner

| SHOP | | LINK |
|---|---|---|
| INVESTIGATION DISCOVERY | <PAGE IDENTIFER 2> | LINK |
| INVESTIGATION DISCOVERY | <PAGE IDENTIFER 3> | LINK |
| INVESTIGATION DISCOVERY | <PAGE IDENTIFER 4> | LINK |
| INVESTIGATION DISCOVERY | <PAGE IDENTIFER 5> | LINK |
| INVESTIGATION DISCOVERY | <PAGE IDENTIFER 6> | LINK |
| INVESTIGATION DISCOVERY | <PAGE IDENTIFER 7> | LINK | footer, cover page, and text box designs that complement each other. For example, you can add a matching cover page, header, and sidebar. Click Insert and then choose the elements you want from the different galleries.

Themes and styles also help keep your document coordinated. When you click Design and choose a new Theme, the pictures, charts, and SmartArt graphics change to match your new theme. When you apply styles, your headings change to match the new theme.

FIG. 5

PROVIDING CONTEXTUALLY RELEVANT INFORMATION FOR AMBIGUOUS LINK(S)

RELATED APPLICATION

This application claims priority to U.S. Provisional Application No. 62/852,190, filed May 23, 2019, entitled "Providing Contextually Relevant Information for Ambiguous Link(s)", the disclosure of which is hereby incorporated by reference herein in its entirety.

BACKGROUND

Screen reader(s) can verbally provide information regarding object(s) (e.g., content) displayed to a user. The information provided can assist visually impaired user(s) to understand and/or navigate displayed content. For example, the screen reader can read text to the user and/or verbally provide information regarding control(s) and/or other object(s) that are being displayed. User(s) can interact with the screen reader, for example, using pre-defined key(s) of a keyboard and/or via other user input device(s)

SUMMARY

Described herein is a screen reader system, comprising: a processing system comprising a processor and a memory having computer-executable instructions stored thereupon which, when executed by the processor, cause the processing system to: receive input from a user requesting information about a particular link of a web page; in response to the received user input, provide a request for contextually relevant information regarding the particular link to a search engine, the request comprising a uniform resource locator (URL) associated with the particular link; receive contextually relevant information regarding the particular link from the search engine; and provide the received contextually relevant information to the user in response to the received request for information.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIGS. 2-5 are diagrams of exemplary user interfaces.

DETAILED DESCRIPTION

Figure 1:
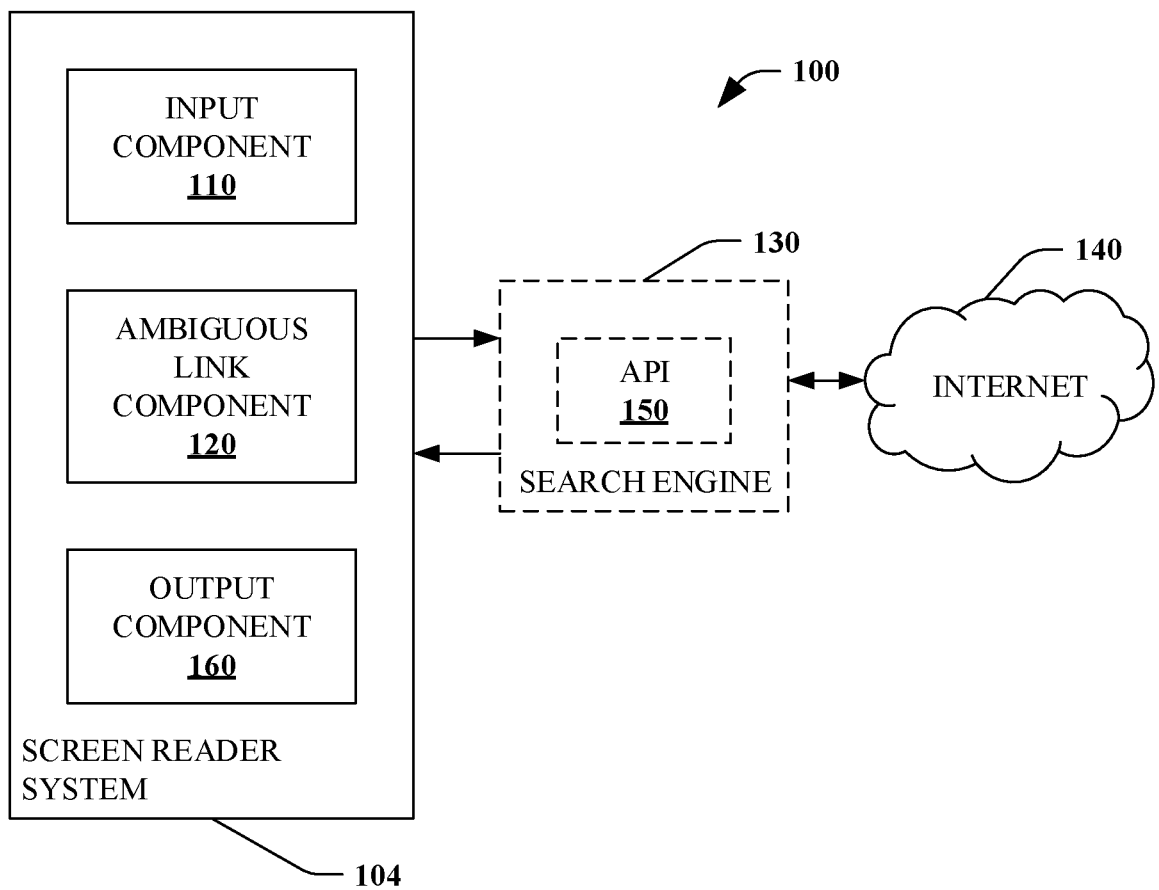
FIG. 1 is a functional block diagram that illustrates a system for providing contextually relevant information for an ambiguous link.

Various technologies pertaining to verbally providing contextual information for ambiguous link(s) of presented content (e.g., a web page or document) are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding verbally providing information for ambiguous link(s) of presented content. What follows are one or more exemplary systems and methods.

Aspects of the subject disclosure pertain to the technical problem of assisting user(s) (e.g., visually impaired user(s)) to navigate ambiguous link(s) within content (e.g., web page, document). The technical features associated with addressing this problem involve receiving input from a user requesting information about a particular link of a web page; in response to the received user input, providing a request for contextually relevant information regarding the particular link to a search engine, the request comprising a uniform resource locator (URL) associated with the particular link; receiving contextually relevant information regarding the particular link from the search engine; and providing the received contextually relevant information to the user in response to the received request for information. Accordingly, aspects of these technical features exhibit technical effects of more efficiently and effectively providing contextually relevant information to a user regarding ambiguous link(s), for example, reducing consumption of computer resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

When a computer user navigates the web using a screen reader, it is very common for users to navigate by moving between links embedded within a web page (e.g., either by pressing a pre-defined key such as "k" in a scan mode of a screen reader or tabbing through links using a keyboard) and/or by bringing up a list of links embedded within the web page. However, when link(s) are ambiguous, the user is frequently unable to meaningfully navigate through the links and/or contextually understand the link.

In some embodiments, an "ambiguous link" refers to a link with no or limited contextual meaning. For example, a link described as "click here" by a screen reader is of little or no value to the user since the user would not be provided with information regarding why the user should select the link, where the user would be navigated to if the user selects the link, and, what content is available via selection of the link. Thus, the user isn't able to meaningfully ascertain where each link will take the user.

Conventionally, the user selects and navigates through the entire page to get the context of each link. That is, select a particular link, navigation to the associated page, and then return to the original page, select the next link, etc.

In some embodiments, "ambiguous links" can refer to links on a particular web page or particular document with the same or substantially similar textual description. For example, a web page having ten links described as "investigation discovery" does not provide contextually relevant information allowing the user to meaningfully select a particular one of the ten links.

Referring to FIG. 1, a system for providing contextually relevant information for an ambiguous link 100 is illustrated. For example, the ambiguous link can comprise a link of a web page that provides no or limited contextual meaning such as unclear name (e.g., "click here", "learn more", etc.).

The system 100 includes a screen reader system 104 comprising an input component 110 that receives input from a user requesting information about a particular link of a web page. In some embodiments, the received input comprises a keyboard command comprising one or more keys (e.g., sequentially pressed and/or pressed in combination). In some embodiments, when a user is on a hyperlink and presses a screen reader key and a smart command feature invocation (e.g., control D), the screen reader can indicate that it is "Fetching Page Title", and then indicate the page title for where the link is going. In some embodiments, when the user is on an image that is also a link the screen reader can indicate "Fetching Image Caption and Page Title" and then indicate the image caption and then the page title for where the image link is going.

The screen reader system 104 further includes an ambiguous link component 120 that, in response to the received user input, provides a request for contextually relevant information regarding the particular link to a search engine 130 that maintains information regarding a source of web pages such as the Internet 140. In some embodiments, the request includes a uniform resource locator (URL) associated with the particular link.

In some embodiments, the ambiguous link component 120 provides the request for contextually relevant information using an application programming interface 140 of the search engine 130 (e.g., Bing®). In response to a request including a URL, the application component 140 search engine 130 provides contextually relevant information (e.g., a page title) associated with the particular URL.

The ambiguous link component 120 receives contextually relevant information regarding the particular link from the search engine 130 which is provided to the user via an output component 160 (e.g., screen reader). In some embodiments, the contextually relevant information comprises a page title associated with the URL associated with the particular link.

In some embodiments, the contextually relevant information comprises metadata stored with the web page describing the web page for visually impaired user(s) (e.g., attribute field designated for describing the web page). In some embodiments, this metadata can be generated using a model machine-trained to provide web page descriptions for visually impaired user(s). In some embodiments, this metadata can be generated by human(s) to provide web page descriptions for visually impaired user(s).

The output component 160 provides the received contextually relevant information to the user in response to the received request for information (e.g., verbally read by screen reader). In some embodiments, the output component 160 provides a page title associated with the link (e.g., hyperlink). In some embodiments, when an element comprises an image with a link, the output component 160 provides both an image caption and a page title.

In some embodiments, the screen reader component 140 can verbally differentiate text that is on the screen from extra text that is being provided (e.g., contextually relevant information such as page title) for example using a different pitch. In some embodiments, the screen reader component 140 can display the received contextually relevant information on a user interface (UI) of it's own.

Figure 2:
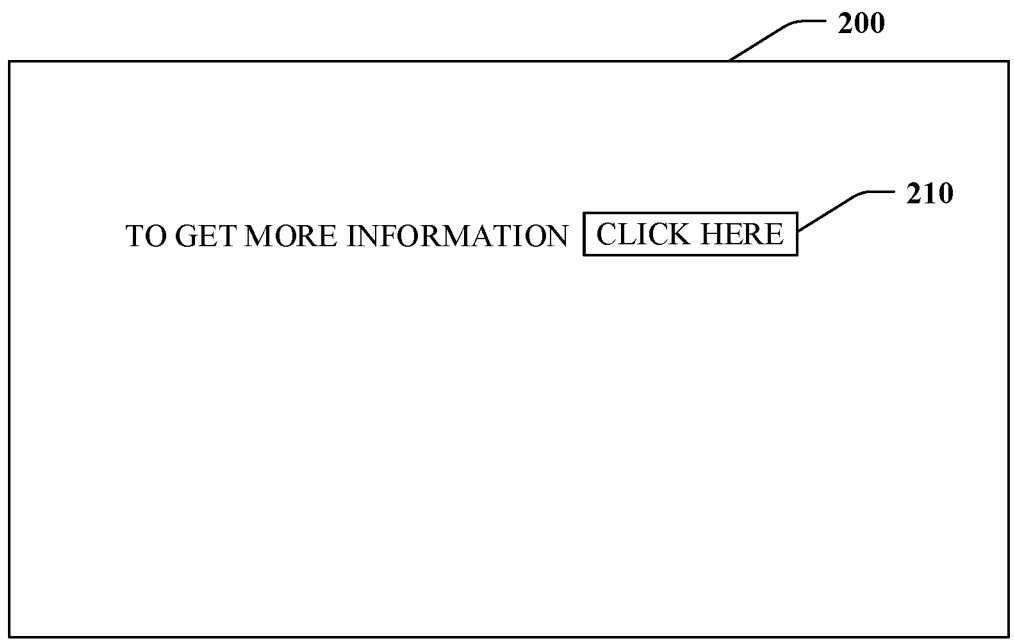

Referring to FIG. 2, a diagram of an exemplary user interface 200 is illustrated. The user interface includes an ambiguous link ("click here").

Figure 3:
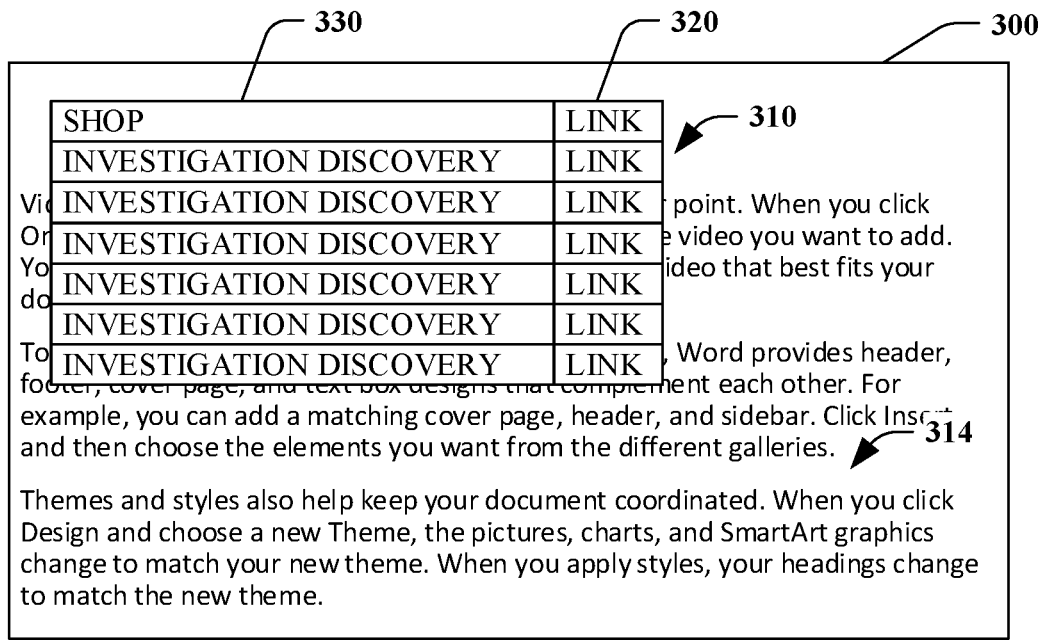

Turning to FIG. 3, a diagram of an exemplary user interface 300 is illustrated. The user interface includes a list 310 (e.g., table) of hyperlinks embedded within a web page 314. The list 310 includes an element type field 320 (e.g., "link") and a link text field 330. For purposes of explanation and not limitation, in this example, six of entries in the list 310 include the link text "investigation discovery" which would be ambiguous to a user since there is no information differentiating these links one from another.

Figure 4:
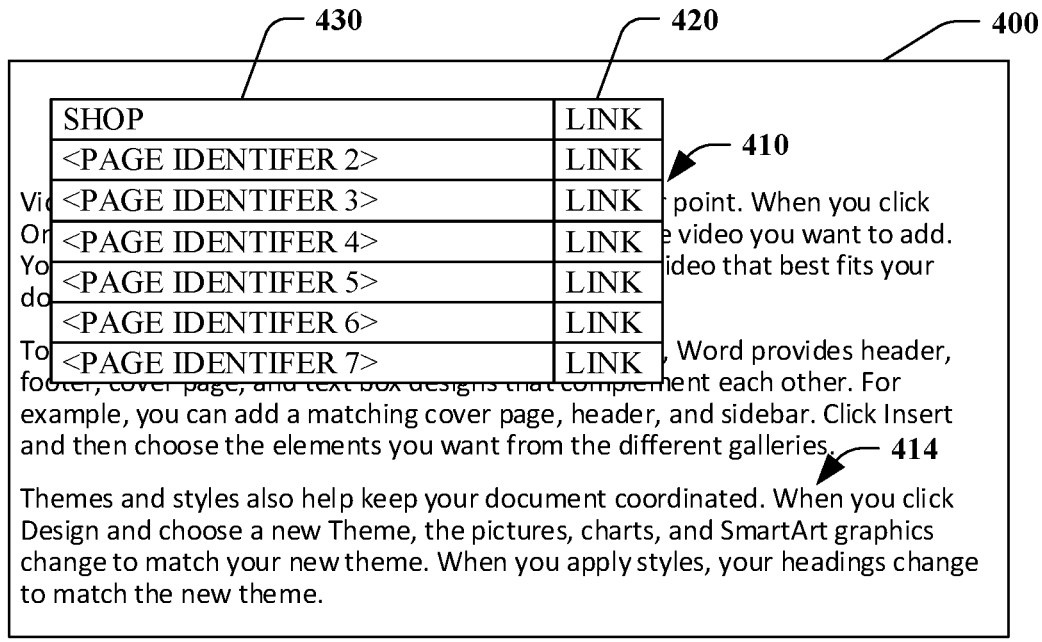

Referring to FIG. 4, a diagram of an exemplary user interface 400 is illustrated. The user interface 400 includes a list 410 (e.g., table) of hyperlinks embedded within a web page 414. The list 410 includes an element field 420 and a contextually relevant information field 430 (e.g., page identifiers). The contextually relevant information field 430 includes page identifiers for each of the ambiguous links of FIG. 3, for example, generated by the screen reader system 104.

Turning to FIG. 5, a diagram of an exemplary user interface 500 is illustrated. The user interface 500 includes a list 510 of hyperlinks embedded within a web page 514. The list 510 includes an element field 520, a contextually relevant information field 530, for example, generated by the screen reader system 104, and, a link text field 540.

FIGS. 6-9 illustrate exemplary methodologies relating to providing contextually relevant information for an ambiguous link(s). While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 6:
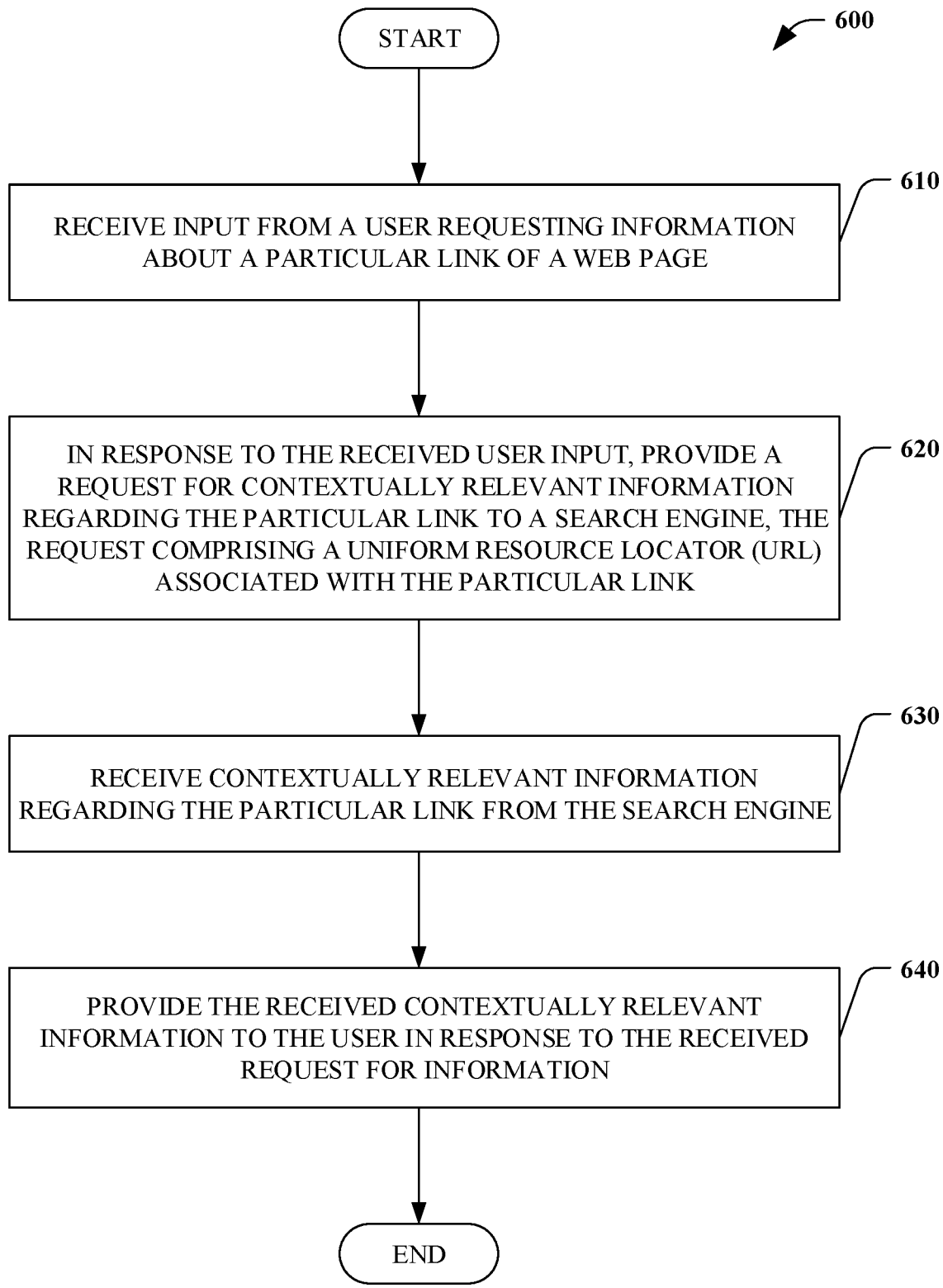
FIG. 6 is a flow chart that illustrates a method of providing contextually relevant information for an ambiguous link.

Referring to FIG. 6, a method of providing contextually relevant information for an ambiguous link 600 is illustrated. In some embodiments, the method 600 is performed by the screen reader system 104.

At 610, input is received from a user requesting information about a particular link of a web page. At 620, in response to the received user input, a request for contextually relevant information regarding the particular link is provided to a search engine. The request can include a uniform resource locator (URL) associated with the particular link.

At 630, contextually relevant information regarding the particular link is received from the search engine. At 640, the received contextually relevant information is provided to the user (e.g., read verbally to user) in response to the received request for information.

Figure 7:
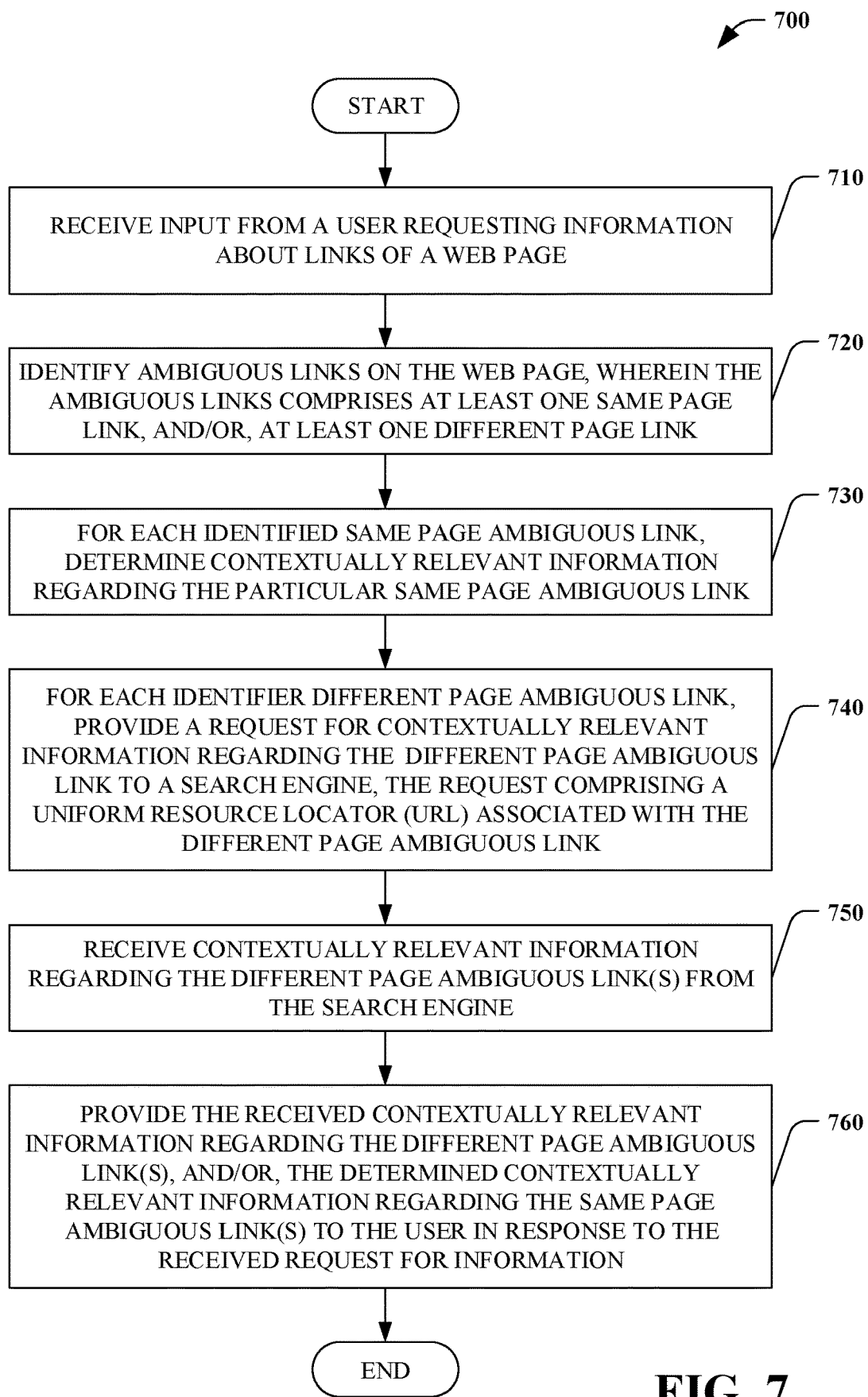
FIG. 7 is a flow chart that illustrates a method of providing contextually relevant information for an ambiguous link.

Turning to FIG. 7, a method of providing contextually relevant information for an ambiguous link 700 is illustrated. In some embodiments, the method 700 is performed by the screen reader system 104.

At 710, input is received from a user requesting information about links of a web page. At 720, ambiguous links on the web page are identified, wherein the ambiguous links comprises at least one same page link, and/or, at least one different page link. At 730, for each identified same page ambiguous link, contextually relevant information is determined regarding the particular same page ambiguous link.

In some embodiments, heuristics can be applied to determine the contextually relevant information. If a heading or other structurally relevant information is present, the heading or structurally relevant information can be determined to be the contextually relevant information. If a heading or other structurally relevant information is not present, a first sentence (or portion of the first sentence) where the same page link connects to is determined to be the contextually relevant information.

At 740, for each identified different page ambiguous link, a request for contextually relevant information regarding the different page ambiguous link is provided to a search engine. The request includes a uniform resource locator (URL) associated with the different page ambiguous link.

At 750, contextually relevant information regarding the different page ambiguous link(s) is received from the search engine. At 760, the received contextually relevant information regarding the different page ambiguous link(s), and, the determined contextually relevant information regarding the particular same page ambiguous link is provided to the user in response to the received request for information.

Figure 8:
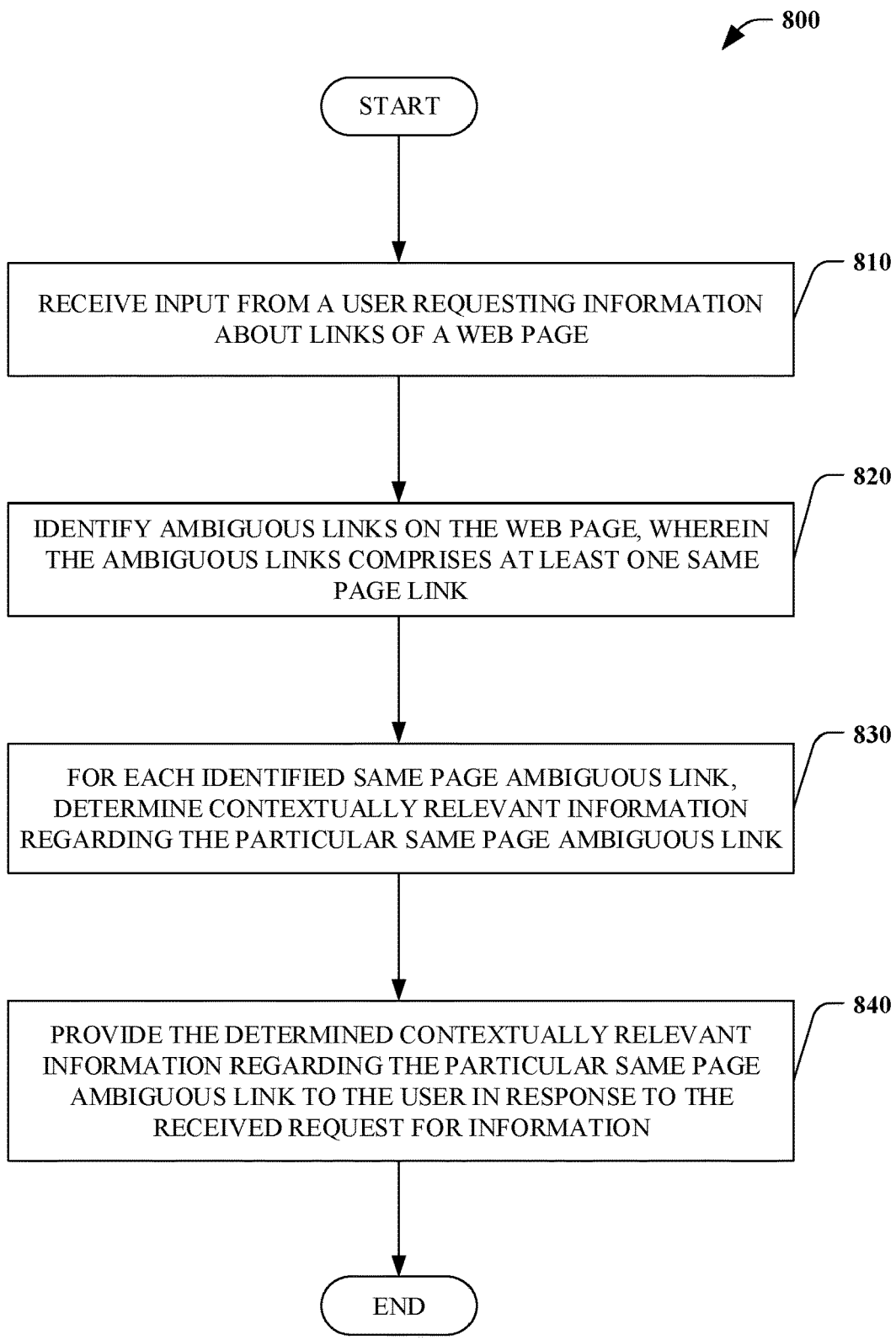
FIG. 8 is a flow chart that illustrates a method of providing contextually relevant information for an ambiguous link.

Next, referring to FIG. 8, a method of providing contextually relevant information for an ambiguous link 800 is illustrated. In some embodiments, the method 800 is performed by the screen reader system 104.

At 810, input is received from a user requesting information about links of a web page. At 820, ambiguous link(s) on the web page are identified. The ambiguous link(s) include same page link(s).

At 830, for each identified same page ambiguous link, contextually relevant information regarding the particular same page ambiguous link is determined. At 840, the determined contextually relevant information regarding the particular same page ambiguous link is provided to the user in response to the received request for information.

Figure 9:
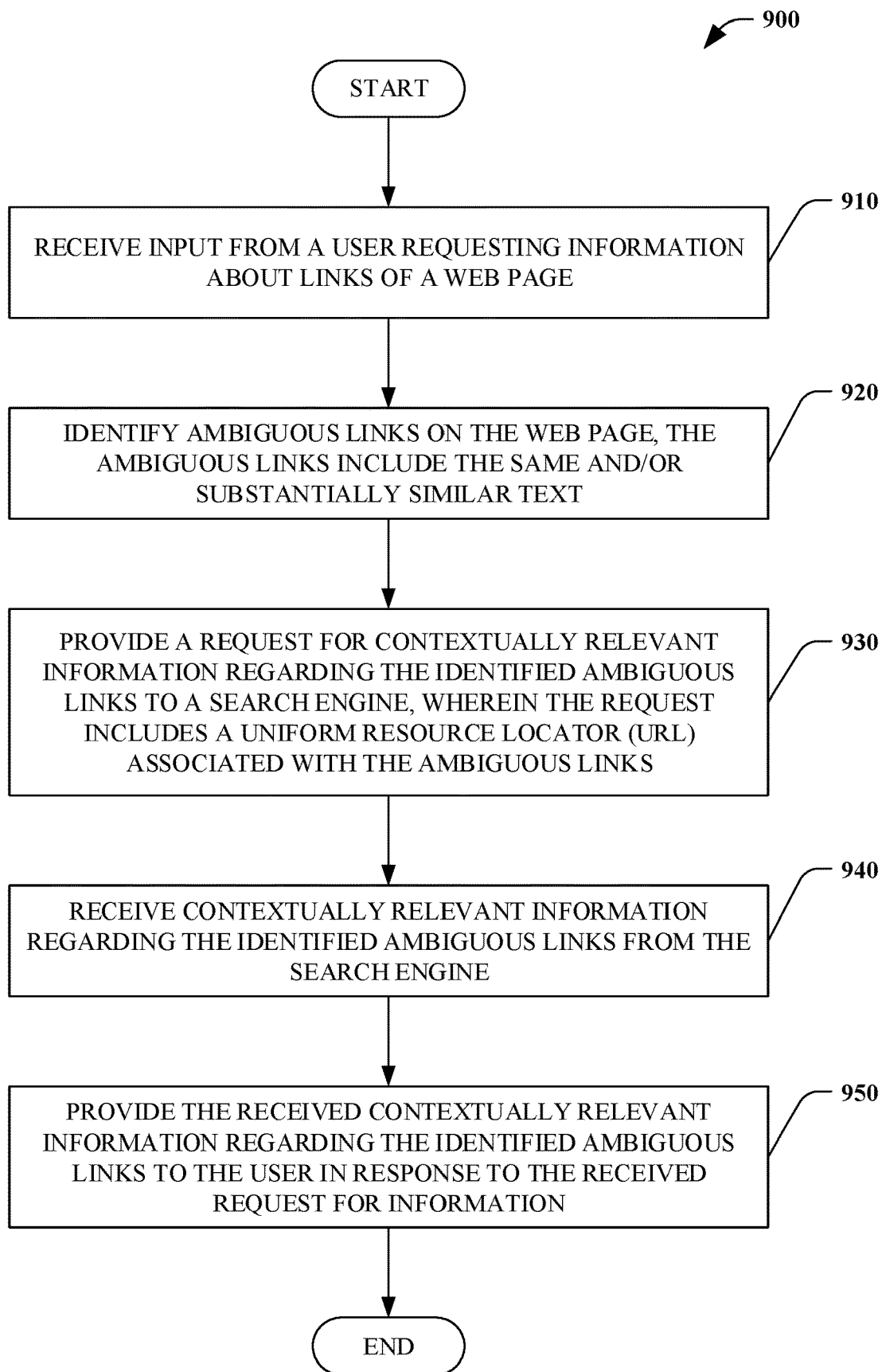
FIG. 9 is a flow chart that illustrates a method of providing contextually relevant information for an ambiguous link.

Turning to FIG. 9, a method of providing contextually relevant information for an ambiguous link 900 is illustrated. In some embodiments, the method 900 is performed by the screen reader system 104.

At 910, input is received from a user requesting information about links of a web page. At 920, ambiguous links on the web page are identified. The ambiguous link(s) include the same and/or substantially similar text. That is, the link does not provide a clear name to disambiguate the link from other links on the web page. For example, multiple links with the same name ("Investigation Discovery").

At 930, a request for contextually relevant information regarding the identified ambiguous links is provided to a search engine. The request includes a uniform resource locator (URL) associated with the ambiguous links. In some embodiments, a single request is sent to the search engine. In some embodiments, a request is sent to the search engine for each identified ambiguous link.

At 940, contextually relevant information regarding the identified ambiguous links is received from the search engine. At 950, the received contextually relevant information regarding the identified ambiguous links is provided to the user in response to the received request for information. In some embodiments, the contextually relevant information regarding the identified ambiguous links is provided in place of the identified ambiguous links. In some embodiments, the contextually relevant information regarding the identified ambiguous links is provided in addition to the identified ambiguous links.

Described herein is a screen reader system, comprising: a processing system comprising a processor and a memory having computer-executable instructions stored thereupon which, when executed by the processor, cause the processing system to: receive input from a user requesting information about a particular link of a web page; in response to the received user input, provide a request for contextually relevant information regarding the particular link to a search engine, the request comprising a uniform resource locator (URL) associated with the particular link; receive contextually relevant information regarding the particular link from the search engine; and provide the received contextually relevant information to the user in response to the received request for information.

The system can further include wherein the contextually relevant information regarding the particular link comprises a page identifier of a web page associated with the particular link. The system can further include wherein the contextually relevant information regarding the particular link comprises a page title associated with the uniform resource locator associated with the particular link. The system can further include wherein the contextually relevant information is displayed to the user.

The system can further include wherein the contextually relevant information displayed to the user along with the particular link. The system can further include wherein the contextually relevant information is provided verbally to the user. The system can further include wherein the particular link is an ambiguous link having a same textual description as another link on the web page. The system can further include wherein the received input comprises a combination of key presses of a keyboard.

Described herein is a method of providing contextually relevant information for an ambiguous link, comprising: receiving input from a user requesting information about links of a web page; identifying ambiguous links on the web page, wherein the ambiguous links comprises at least one of a same page link, or, a different page link; for each identified same page ambiguous link, determining contextually relevant information regarding the same page ambiguous link; for each identified different page ambiguous link: provide a request for contextually relevant information regarding the different page ambiguous link to a search engine, the request comprising a uniform resource locator (URL) associated with the different page ambiguous link; receive contextually relevant information regarding the different page ambiguous link from the search engine; and providing the received contextually relevant information regarding the at least one of the different page link or the same page ambiguous link to the user in response to the received request for information.

The method can further include wherein the contextually relevant information comprises a page identifier of a web page associated with a particular link. The method can further include wherein the contextually relevant information comprises a page title associated with a uniform resource locator associated with a particular link. The method can further include wherein the contextually relevant information is displayed to the user.

The method can further include wherein the contextually relevant information displayed to the user along with a particular link. The method can further include wherein the contextually relevant information is provided verbally to the user. The method can further include wherein ambiguous links on the web page are identified based upon having a same textual description. The method can further include wherein the received input comprises a combination of key presses of a keyboard.

Described herein is a computer storage media storing computer-readable instructions that when executed cause a computing device to: receive input from a user requesting information about links of a web page; identify ambiguous links on the web page, wherein the ambiguous links comprises at least one same page link; for each identified same page ambiguous link, determine contextually relevant information regarding the particular same page ambiguous link; and provide the determined contextually relevant information regarding the particular same page ambiguous link to the user in response to the received request for information.

The computer storage media can further include wherein the determined contextually relevant information regarding the particular same page ambiguous link comprises a page title associated with the uniform resource locator associated with the particular same page ambiguous link. The computer storage media can further include wherein the determined contextually relevant information is displayed to the user. The computer storage media can further include wherein ambiguous links on the web page are identified based upon having a same textual description.

Figure 10:
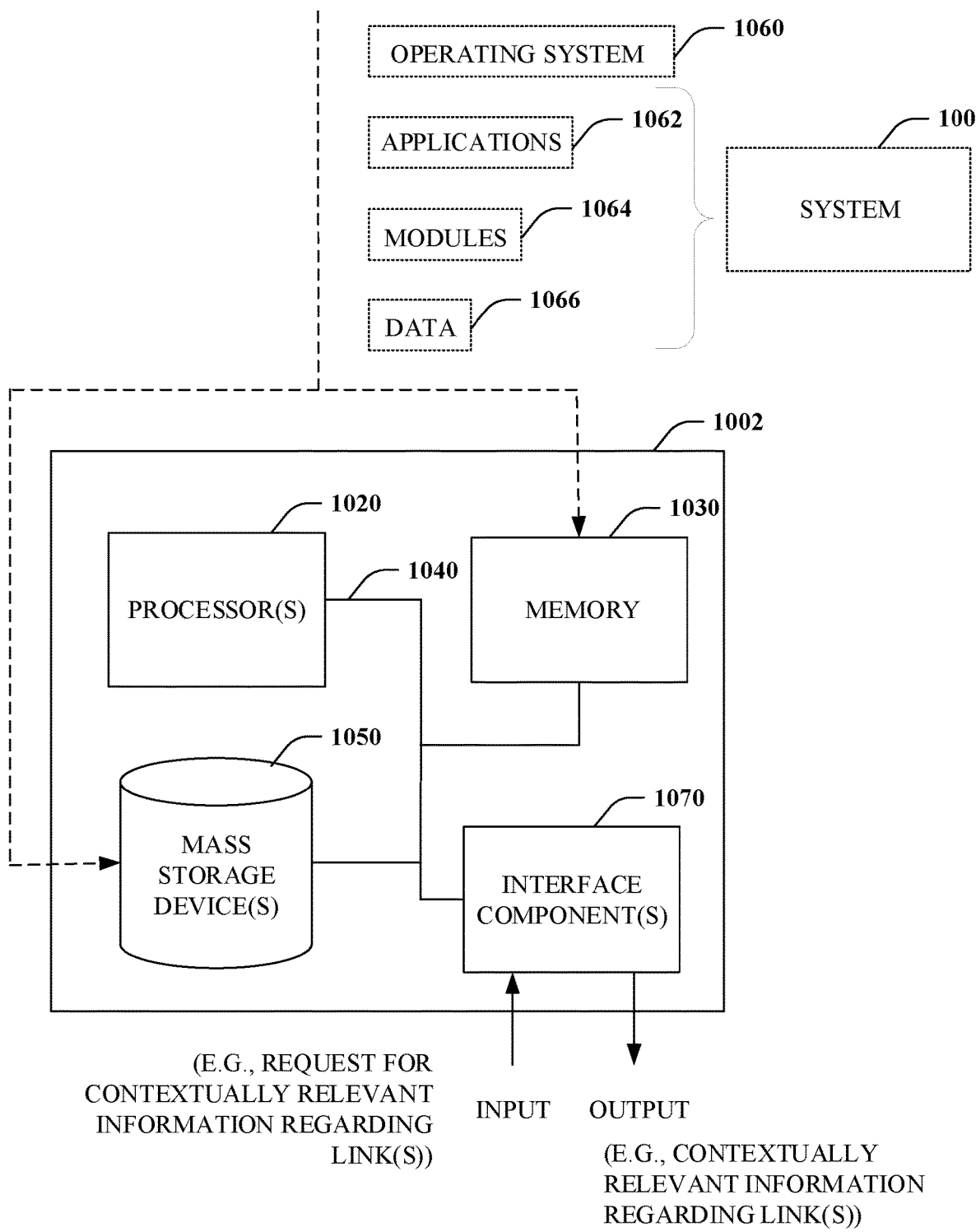
FIG. 10 is a functional block diagram that illustrates an exemplary computing system.

With reference to FIG. 10, illustrated is an example general-purpose processing system, computer or computing device 1002 (e.g., mobile phone, desktop, laptop, tablet, watch, server, hand-held, programmable consumer or industrial electronics, set-top box, game system, compute node, etc.). For instance, the computing device 1002 may be used in a system for providing contextually relevant information for screen reader system 104.

The computer 1002 includes one or more processor(s) 1020, memory 1030, system bus 1040, mass storage device(s) 1050, and one or more interface components 1070. The system bus 1040 communicatively couples at least the above system constituents. However, it is to be appreciated that in its simplest form the computer 1002 can include one or more processors 1020 coupled to memory 1030 that execute various computer executable actions, instructions, and or components stored in memory 1030. The instructions may be, for instance, instructions for implementing functionality described as being carried out by one or more components discussed above or instructions for implementing one or more of the methods described above.

The processor(s) 1020 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 1020 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 1020 can be a graphics processor.

The computer 1002 can include or otherwise interact with a variety of computer-readable media to facilitate control of the computer 1002 to implement one or more aspects of the claimed subject matter. The computer-readable media can be any available media that can be accessed by the computer 1002 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 1002. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 1030 and mass storage device(s) 1050 are examples of computer-readable storage media. Depending on the exact configuration and type of computing device, memory 1030 may be volatile (e.g., RAM), non-volatile (e.g., ROM, flash memory, etc.) or some combination of the two. By way of example, the basic input/output system (BIOS), including basic routines to transfer information between elements within the computer 1002, such as during start-up, can be stored in nonvolatile memory, while volatile memory can act as external cache memory to facilitate processing by the processor(s) 1020, among other things.

Mass storage device(s) 1050 includes removable/non-removable, volatile/non-volatile computer storage media for storage of large amounts of data relative to the memory 1030. For example, mass storage device(s) 1050 includes, but is not limited to, one or more devices such as a magnetic or optical disk drive, floppy disk drive, flash memory, solid-state drive, or memory stick.

Memory 1030 and mass storage device(s) 1050 can include, or have stored therein, operating system 1060, one or more applications 1062, one or more program modules 1064, and data 1066. The operating system 1060 acts to control and allocate resources of the computer 1002. Applications 1062 include one or both of system and application software and can exploit management of resources by the operating system 1060 through program modules 1064 and data 1066 stored in memory 1030 and/or mass storage device (s) 1050 to perform one or more actions. Accordingly, applications 1062 can turn a general-purpose computer 1002 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 1062, and include one or more modules 1064 and data 1066 stored in memory and/or mass storage device(s) 1050 whose functionality can be realized when executed by one or more processor(s) 1020.

In some embodiments, the processor(s) 1020 can correspond to a system on a chip (SOC) or like architecture including, or in other words integrating, both hardware and software on a single integrated circuit substrate. Here, the processor(s) 1020 can include one or more processors as well as memory at least similar to processor(s) 1020 and memory 1030, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 1002 also includes one or more interface components 1070 that are communicatively coupled to the system bus 1040 and facilitate interaction with the computer 1002. By way of example, the interface component 1070 can be a port (e.g., serial, parallel, PCMCIA, USB, FireWire, etc.) or an interface card (e.g., sound, video, etc.) or the like. In one example implementation, the interface component 1070 can be embodied as a user input/output interface to enable a user to enter commands and information into the computer 1002, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 1070 can be embodied as an output peripheral interface to supply output to displays (e.g., LCD, LED, plasma, etc.), speakers, printers, and/or other computers, among other things. Still further yet, the interface component 1070 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A screen reader system, comprising:
   a processor; and
   a memory having computer-executable instructions stored thereupon which, when executed by the processor, cause the screen reader system to:
   identify a particular ambiguous embedded link included in a first web page, wherein the particular ambiguous embedded link is associated with a particular resource locator of a second web page;
   in response to identifying the particular ambiguous embedded link, provide a request to a search engine, the request including the particular resource locator of the second web page;
   receive contextually relevant information regarding the particular ambiguous embedded link from the search engine, wherein the contextually relevant information received from the search engine includes one or more words describing the second web page;
   receive a selection of the particular embedded ambiguous link that is embedded in the first web page; and
   in response to the selection of the particular ambiguous embedded link that is embedded in the first web page, verbally output the one or more words received from the search engine that describe the second web page.

2. The screen reader system of claim 1, wherein the contextually relevant information received from the search engine comprises a page title of the second web page.

3. The screen reader system of claim 1, wherein the contextually relevant information received from the search engine comprises a metadata description of the second web page.

4. The screen reader system of claim 3, wherein the metadata description of the second web page received from the search engine is generated by a model.

5. The screen reader system of claim 4, wherein the model is trained to generate web page descriptions for visually impaired users.

6. The screen reader system of claim 3, wherein the metadata description of the second web page received from the search engine is generated by one or more humans for visually impaired user.

7. The screen reader system of claim 1, wherein the particular ambiguous embedded link shares a textual description with another embedded link on the first web page.

8. The screen reader system of claim 1, wherein the computer-executable instructions, when executed by the processor, cause the screen reader system to:
receive a combination of key presses of a keyboard; and
obtain and output the contextually relevant information responsive to the combination of key presses.

9. A method comprising:
identifying a particular ambiguous embedded link from a plurality of embedded links that are embedded in a document, wherein the plurality of embedded links are directed to different web pages other than the document and the particular ambiguous embedded link is associated with a particular resource locator of a particular web page other than the document;
providing a request identifying the particular resource locator associated with the particular ambiguous embedded link to a search engine;
in response to the request, receiving contextually relevant information regarding the particular ambiguous embedded link from the search engine, wherein the contextually relevant information received from the search engine includes one or more words describing the particular web page;
receiving a selection of the particular ambiguous embedded link that is embedded in the document; and
in response to the selection of the particular ambiguous embedded link that is embedded in the document, verbally reading out the one or more words received from the search engine that describe the particular web page.

10. The method of claim 9, wherein the contextually relevant information comprises a page title of the particular web page that is received from the search engine.

11. The method of claim 9, wherein the contextually relevant information comprises a metadata description of the particular web page received from the search engine.

12. The method of claim 11, wherein the metadata description of the particular web page received from the search engine is generated by a model.

13. The method of claim 11, wherein the metadata description of the particular web page received from the search engine is generated by a model that is trained to generate web page descriptions for visually impaired users.

14. The method of claim 11, wherein the metadata description of the particular web page received from the search engine is generated by one or more humans for visually impaired users.

15. The method of claim 9, further comprising:
determining that the particular ambiguous embedded link is ambiguous based at least on the particular ambiguous embedded link sharing the same textual description as another ambiguous embedded link in the document, wherein the another ambiguous embedded link is associated with another resource locator of another web page other than the document in which the particular ambiguous embedded link and the another ambiguous embedded link are embedded; and
based at least on the determining that the particular ambiguous embedded link is ambiguous, obtaining the contextually relevant information regarding the particular ambiguous embedded link from the search engine.

16. The method of claim 9, further comprising:
receiving a combination of key presses of a keyboard; and
providing the request to the search engine in response to the combination of key presses.

17. A computer storage media storing computer-readable instructions that, when executed, cause a computing device to:
identify a particular same page ambiguous embedded link that is embedded in a first portion of a document, wherein the particular same page ambiguous embedded link enables navigation to a second portion of the document;
determine contextually relevant information regarding the particular same page ambiguous embedded link, wherein the contextually relevant information is obtained from the second portion of the document and disambiguates one or more words of the particular same page ambiguous embedded link that is embedded in the first portion of the document;
receive a selection of the particular same page ambiguous embedded link that is embedded in the first portion of the document; and
responsive to receiving the selection of the particular same page ambiguous embedded link that is embedded in the first portion of the document, output the contextually relevant information that is obtained from the second portion of the document.

18. The computer storage media of claim 17, wherein the contextually relevant information comprises one or more other words obtained from the second portion of the document.

19. The computer storage media of claim 17, wherein the computer-readable instructions, when executed, cause the computing device to:
determine that the particular same page ambiguous embedded link is ambiguous based at least on the particular same page ambiguous embedded link sharing the same textual description with another same page ambiguous embedded link in the document that enables navigation to a third portion of the document; and
output the contextually relevant information that is obtained from the second portion of the document based at least on determining that the particular same page ambiguous embedded link is ambiguous.

20. The computer storage media of claim 19, wherein the computer-readable instructions, when executed, cause the computing device to:
receive another selection of the another same page ambiguous embedded link that is embedded the document; and
responsive to receiving the selection of the another same page ambiguous embedded link that is embedded in the document, output other contextually relevant information that is obtained from the third portion of the document.

21. The method of claim 9, wherein the document includes another ambiguous embedded link that shares the same textual description as the particular ambiguous embedded link and is associated with another resource locator of another web page other than the document, the method further comprising:
responsive to user input tabbing through the plurality of embedded links in the document using a screen reader, verbally reading out descriptions of each embedded link, including at least:
when the user input tabs to the particular ambiguous embedded link, verbally reading out, by the screen reader, the one or more words received from the search engine that describe the particular web page; and when the user input tabs to the another ambiguous embedded link that shares the same textual description with the particular ambiguous embedded link, verbally reading out, by the screen reader, one or more other words received from the search engine that describe the another web page.

* * * * *